United States Patent
Nunez et al.

(10) Patent No.: US 9,472,967 B2
(45) Date of Patent: Oct. 18, 2016

(54) POWER MANAGEMENT SYSTEM AND METHOD FOR A PORTABLE DEVICE

(71) Applicant: MOTOROLA SOLUTIONS, INC, Schaumburg, IL (US)

(72) Inventors: Diego I Nunez, Southwest Ranches, FL (US); Peter J Bartels, Loxahatchee, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 198 days.

(21) Appl. No.: 14/448,509

(22) Filed: Jul. 31, 2014

(65) Prior Publication Data

US 2016/0036260 A1 Feb. 4, 2016

(51) Int. Cl.
*H02J 7/00* (2006.01)
*H02J 5/00* (2016.01)
*B60L 11/18* (2006.01)

(52) U.S. Cl.
CPC ............ *H02J 7/0063* (2013.01); *H02J 7/0047* (2013.01); *B60L 11/1862* (2013.01); *B60L 2210/14* (2013.01); *H02J 5/005* (2013.01); *Y02T 10/7005* (2013.01); *Y02T 10/7225* (2013.01); *Y02T 10/7233* (2013.01)

(58) Field of Classification Search
CPC ........ H02J 5/005; H02J 7/0063; H02J 7/007; B60L 11/1862; B60L 11/1868; B60L 2210/14; Y02T 10/7005; Y02T 10/7225; Y02T 10/7233
See application file for complete search history.

(56) References Cited

U.S. PATENT DOCUMENTS

| | | | |
|---|---|---|---|
| 4,267,467 A * | 5/1981 | Tsukada | G04G 15/003 307/141 |
| 4,288,831 A * | 9/1981 | Dolikian | H02M 3/33507 323/247 |
| 4,713,607 A | 12/1987 | Pepper | |
| 4,956,563 A * | 9/1990 | Schornack | H02J 9/062 307/66 |
| 5,254,930 A * | 10/1993 | Daly | H02J 7/0026 320/119 |
| 5,574,358 A * | 11/1996 | Garrett | G05F 1/465 323/276 |
| 5,862,394 A * | 1/1999 | Watts | G06F 1/30 713/330 |
| 5,903,764 A * | 5/1999 | Shyr | H02J 7/0004 307/64 |
| 6,560,083 B2 | 5/2003 | Nguyen | |
| 6,898,446 B2 * | 5/2005 | Muto | H04W 52/0261 340/7.37 |
| 7,111,762 B2 | 9/2006 | Saunders et al. | |
| 7,285,935 B2 | 10/2007 | Fuge | |
| 7,408,325 B2 | 8/2008 | Yamamoto et al. | |
| 7,471,071 B2 | 12/2008 | Ng et al. | |
| 7,663,858 B2 * | 2/2010 | Santero | F02D 41/20 361/160 |
| 8,258,654 B2 * | 9/2012 | Parsons | H05B 37/0227 307/116 |
| 8,994,331 B2 * | 3/2015 | Kerfoot, Jr. | H01M 10/44 320/107 |

(Continued)

FOREIGN PATENT DOCUMENTS

| GB | 1148931 A | 4/1969 |
|---|---|---|
| WO | 2007038151 A3 | 4/2007 |

*Primary Examiner* — Helen Rossoshek
(74) *Attorney, Agent, or Firm* — Barbara R. Doutre; Scott M. Garrett

(57) ABSTRACT

A method and circuit for avoiding a low voltage shutdown in a portable device due to a low voltage falsely indicating a discharged battery employs an input current sensing circuit to determine when a high current is being drawn by the portable device. When the portable device is drawing a high current from the battery, the shutdown function is at least temporarily suppressed. If, during the high current event, the battery behavior indicates that it is actually near fully discharged, the shutdown functionality can be enabled to shut down the portable device.

10 Claims, 7 Drawing Sheets

(56) References Cited

U.S. PATENT DOCUMENTS

| | | | |
|---|---|---|---|
| 9,300,158 B2* | 3/2016 | Kerfoot, Jr. | H02J 7/00 |
| 2005/0101287 A1* | 5/2005 | Jin | H04M 1/677 |
| | | | 455/404.1 |
| 2006/0222397 A1* | 10/2006 | Lowman | G03G 15/5004 |
| | | | 399/88 |
| 2008/0058883 A1* | 3/2008 | Gautier | G06F 1/3203 |
| | | | 607/29 |
| 2008/0259656 A1* | 10/2008 | Grant | H02M 3/33523 |
| | | | 363/21.18 |
| 2010/0054010 A1* | 3/2010 | Darroman | B60L 1/00 |
| | | | 363/131 |
| 2010/0219790 A1* | 9/2010 | Chadbourne | G06F 1/266 |
| | | | 320/107 |
| 2011/0009173 A1* | 1/2011 | Kumamoto | H04W 52/028 |
| | | | 455/574 |
| 2011/0127831 A1* | 6/2011 | Skarani | G06F 1/263 |
| | | | 307/10.7 |
| 2012/0256598 A1 | 10/2012 | Hsu et al. | |
| 2012/0268094 A1* | 10/2012 | Scaldaferri | H02M 3/156 |
| | | | 323/284 |
| 2013/0307435 A1* | 11/2013 | Takagimoto | G05F 1/468 |
| | | | 315/224 |
| 2014/0265559 A1* | 9/2014 | Leehey | B60L 1/003 |
| | | | 307/10.1 |
| 2015/0137610 A1* | 5/2015 | Kohout | H02J 5/005 |
| | | | 307/104 |

* cited by examiner

POWER MANAGEMENT SYSTEM AND METHOD FOR A PORTABLE DEVICE

BACKGROUND

Many portable electronic devices are powered by rechargeable batteries where use of primary (non-rechargeable) battery technology would be prohibitively expensive given the rate at which the battery charge is depleted by the device. In some devices it is important to monitor the battery charge level as the battery is discharged to avoid undesired operation due to low voltage. Typically, when a battery reaches an end of charge condition and becomes fully discharged, the battery voltage begins to fall rapidly. Accordingly, it is common to set or select a shutdown threshold in the device where, upon the battery voltage falling to the shutdown threshold, the device will initiate a shutdown process to shut off the device and avoid undesired operation. The shutdown threshold is selected to give sufficient time to shut down device circuitry on the assumption that the battery is discharged or nearly discharged (and as a result, the voltage is dropping rapidly). The shutdown threshold is typically selected without regard for the amount of current being sourced by the battery to the device.

As an example of circuitry that can necessitate a shutdown, devices operating at low battery voltages (i.e., singe cell 3.6V) often require a DC converter to boost the battery voltage up to a stable voltage that is higher than the battery voltage. These DC/DC regulators require a minimum input voltage to produce the desired output boosted voltage, and may be either always on or activated as needed while the battery voltage decreases as it discharges during use. Either boost or buck/boost regulators may be used, depending on the application, and both provide stable and predictable power output at a predetermined constant voltage.

Typically battery voltage monitoring involves sampling the voltage at, or as close as physically possible to, the positive battery terminal where the device and battery connect. When the battery voltage drops below the set or selected shutdown threshold, a power management circuit can initiate steps to shut down the device. The shutdown threshold can be either fixed or programmable, and it is often defined by different limitations such as battery capacity or the presence of circuits, which are powered directly by the battery, shutting off A problem can arise when a device draw a high peak current from the battery (this inrush might be due to a radio transmit situation—for example, during radio transmission). The current drawn from the battery, combined with a finite, but significant amount of internal battery impedance, causes the sampled battery voltage to fall below the shutdown threshold used by the power management circuit. Accordingly, the power management circuit detects a low battery voltage condition and performs one or more series of actions that result in a power-down of the device (this is also often done to protect the cells from over-discharge).

However, a transient drop in battery voltage does not necessarily indicate a discharged or nearly discharged battery (where the cell voltage falls below some manufacturer guaranteed limit). For example, when a battery is very cold it can have an increased internal resistance that, during a high current demand, results in the battery voltage (as sampled at the device's positive battery contact) dropping below a shutdown threshold even when the battery has significant charge remaining, and thus, while under the shutdown threshold, the battery voltage will remain relatively steady, rather than drop quickly as occurs with a nearly discharged battery. As a result, it is possible to have a charged battery, but a have a battery voltage at a level that would "trick" the power management circuit into acting as if the battery is at an end of discharge condition, thus causing the shutdown procedure to commence.

Accordingly, there is a need for a method and apparatus for continuing device operation when the voltage falls below a shutdown threshold due to a high current condition.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
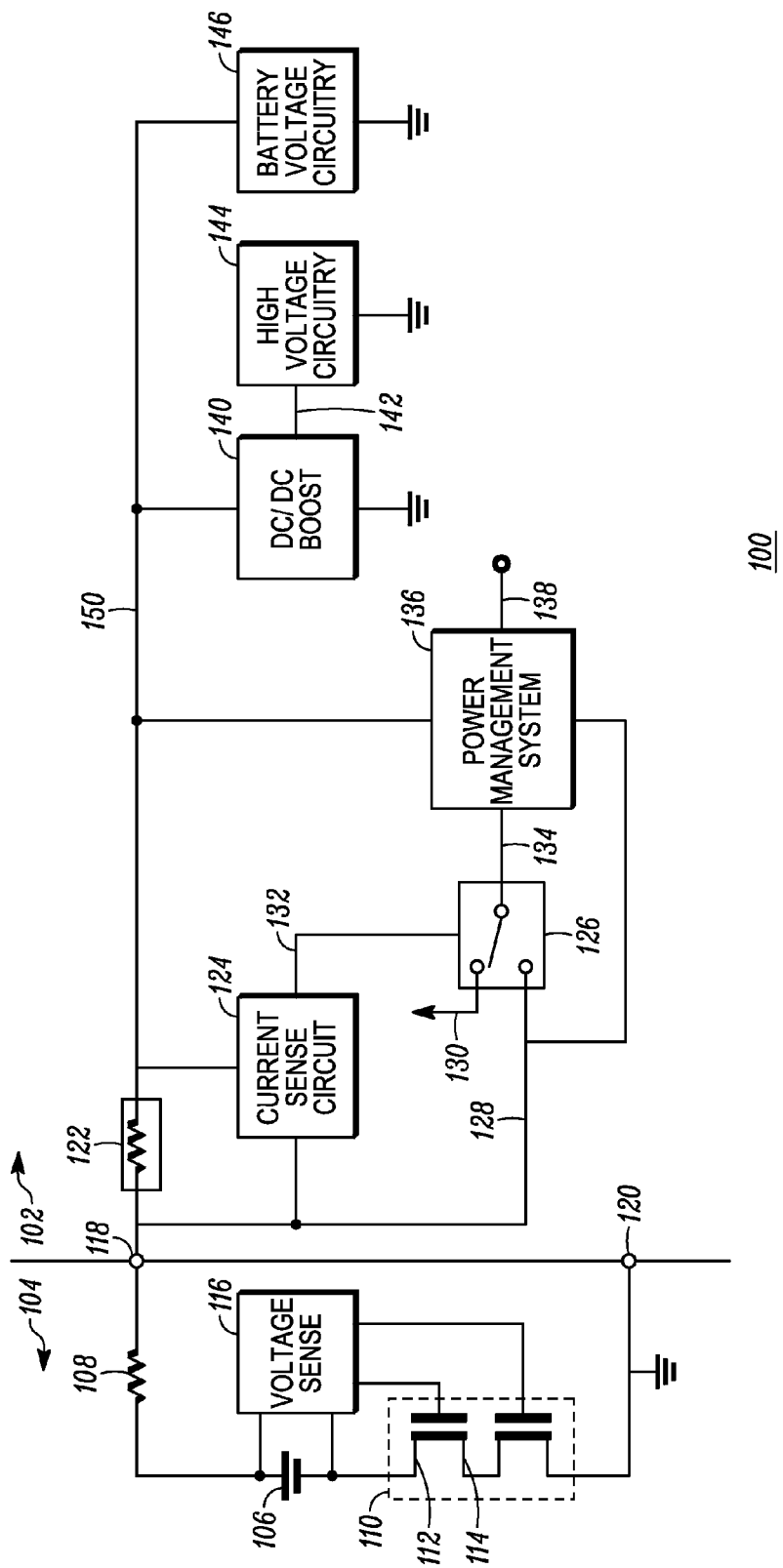
FIG. 1 is a schematic block diagram of a portable device that avoids shutting down due to a false low voltage condition, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments for avoiding shutdown of a portable device due to a false low voltage condition include a power management system for a portable device. The power management system includes a power management controller that compares an input voltage provided by the battery to a shutdown threshold and initiates a shutdown of the portable device when the input voltage falls below the shutdown threshold. The power management system also includes a voltage monitoring switch that selects the voltage input to be provided to the power management controller and has an output which provides the input voltage to the power management controller. The voltage monitoring switch has a first input connected to a positive battery terminal of the portable device, a second input connected to a voltage source that is higher than the shutdown threshold, and a control input. The voltage monitoring switch alternately connects either the first input or the second input to the output responsive to a control signal provided to the control input. The power management system further includes a current detection circuit that provides the control signal to the voltage monitoring switch based on an input current through the positive battery terminal of the portable device. When the input current exceeds a high current threshold the circuit provides the control signal at a level that causes the voltage monitoring switch to connect the second input to the output, and the control signal is provided to cause the voltage monitoring switch to connect the first input to the output, otherwise.

FIG. 1 is a schematic block diagram of a portable device 100 that avoids shutting down due to a low voltage condition caused by a transient high current demand, in accordance with some embodiments. The low voltage can result when the battery has a high impedance due to, for example, environmental conditions, rather than being near end of charge. For example, when a battery is unusually cold its internal electrical resistance increases. As a result, when a relatively high current is drawn from the cold battery there is a larger than typical voltage drop, and that drop can start at an already depressed voltage, even for a fully charged battery. Accordingly, since shutdown criteria is meant to protect against rapidly dropping voltage typical of a near fully discharged battery, applying a static shutdown criteria by a portable device powered by the battery to anticipate and preempt an undervoltage condition can lead to shutting down the portable device when there is actually substantial charge in the battery (i.e. a false low voltage condition).

The portable system 100 includes a portable device 102 that can be powered by a rechargeable battery 104 (also referred to as a battery pack). The interface between the portable device 102 and the battery 104 includes a positive battery terminal 118 and a ground terminal 120 for returning current to the battery 104. The battery 104 includes one or more rechargeable battery cells 106 which can have an internal resistance, modeled as a series resistance 108. The internal resistance can vary with several battery parameters, including state of charge, temperature, and age. Accordingly, when current is drawn from the battery 104, the voltage across terminals 118, 120, will drop from an open circuit voltage, or light load voltage, due to voltage division across the internal resistance. Under some conditions the voltage drop can cause the battery voltage to drop below a shutdown threshold used by the portable device 102 to anticipate an end of charge condition of the battery 104.

The battery 104 includes a voltage sensing circuit 116 that senses voltage across the battery cell(s) and operates a switch block 110 that can include an under-voltage protection switch 112 and an over-voltage protection switch 114. The voltage sensing circuit 116 keeps both switches 112, 114 closed while the battery voltage remains between an under-voltage threshold and an overvoltage threshold. If the sensed cell voltage falls below the undervoltage threshold the voltage sensing circuit 116 opens the under-voltage protection switch 112, and if the cell voltage exceeds the over-voltage threshold it opens the over-voltage switch 114.

The conventional shutdown used by a portable device such as device 102 can be performed by a power management controller 136 that samples battery voltage (i.e. at the positive battery terminal 118). The power management controller 136 compares voltage provided to an input 134 to a shutdown threshold, and when the input voltage falls below the shutdown threshold the power management controller 136 initiates a shutdown procedure to shut down the portable device 102, such as by asserting a shutdown signal 138 that can be provided to, for example, a microprocessor of the portable device 102. The shutdown threshold used by the power management controller 136 is selected to be higher than, for example, the under-voltage threshold used by the voltage sensing circuit 116 of the battery 104 in order to avoid the battery 104 shutting off due to opening the under-voltage switch 112. However, the shutdown threshold can also be based on a voltage level that would be evident when the battery reaches a near-fully discharged state, where the battery voltage is expected to drop rapidly.

However, given that a low voltage (i.e. lower than the shutdown threshold) may not necessarily mean the that the battery 104 is approaching an end of charge condition, where continuing to discharge the battery cells 106 could potentially result in a battery under-voltage condition, the portable device can recognize the occurrence of a sudden high current condition (i.e. current demand of the portable device 102) that causes the battery voltage to drop below the shutdown threshold, and at least temporarily prevent the power management controller 136 from shutting down the portable device 102, especially if there is no other indication that the battery is close to being discharged.

The portable device 102 includes a current sense circuit 124 that senses current drawn from the battery 104 through the positive battery terminal 118. Current sensing is accomplished by sensing the voltage across a resistive element 122 having a known resistance. In some embodiments the resistive element 122 can be a section of a printed circuit board conductor or runner In some embodiments the resistive element 122 can be a resistor component. In some embodiments, when the voltage across the resistive element 122 exceeds a high current threshold, the current sense circuit 124 outputs a control signal on line 132. The high current threshold can be set to correspond to an absolute current magnitude or, in some embodiments, it can be a differential value from one time period to another. The high current threshold is selected to correspond to a current or change in current that is large enough to cause a significant drop in battery voltage if the battery were, for example, significantly charged but very cold. The particular high current threshold used will depend on the particular application.

The input voltage 134 provided to the power system controller 136 is either the voltage at the positive battery terminal 118, or a safe voltage source, depending on the state of a voltage monitoring switch 126. The voltage monitoring switch has a first input connected to the positive battery terminal 118, and a second input 130 connected to a voltage reference that provides a voltage that is greater than the shutdown threshold used by the power management controller 136. The voltage monitoring switch 126 also has a control input connected to line 132 that receives the control signal from the current sense circuit 124. The voltage monitoring switch 126 also has an output that provides the selected voltage output 134 to the power management controller 136, which compares the voltage at 134 to the shutdown threshold.

When the current through the resistive element 122 is below the high current threshold, the current sense circuit 124 does not assert the control signal on line 132, which causes the voltage monitoring switch 126 to connect the input voltage at the positive battery terminal 118 to the input of the power management controller 136 via line 134. However, if the voltage across the resistive element 122 exceeds the high current threshold, then the current sense circuit 124 asserts the control signal on line 132, causing the voltage monitoring switch 126 to connect the voltage reference connected to input 130 to the input of the power management controller 136 to ensure that the power management controller 136 does not commence the shutdown process. Thus, during high current conditions, when the current drawn through the positive battery terminal exceeds a high current threshold, the power management controller is prevented from shutting down the portable device by switching the voltage reference at 130 to the input of the power management controller 136.

The portable device 102 can also include a DC-DC boost converter 140 or an equivalent circuit that generates a boost voltage on line 142 that is higher than a battery voltage on line 150 so as to power a high voltage circuit 144, such as, for example, an audio power amplifier. The boost converter 140 is an example of a circuit for generating a higher voltage output from an input voltage. Here, the battery voltage is used as an input voltage for generating a higher voltage. Other circuits, such as a voltage doubler, can be used in some applications. In addition to the high voltage circuit 144, the portable device 102 also includes one or more battery voltage circuits 146 that are powered either directly by the battery voltage on line 150 or by a lower voltage that is regulated from the battery voltage on line 150. The power management controller 136 and current sense circuit 124 can be considered to be battery voltage circuits as they are not powered by the DC-DC boost converter 140.

Figure 2:
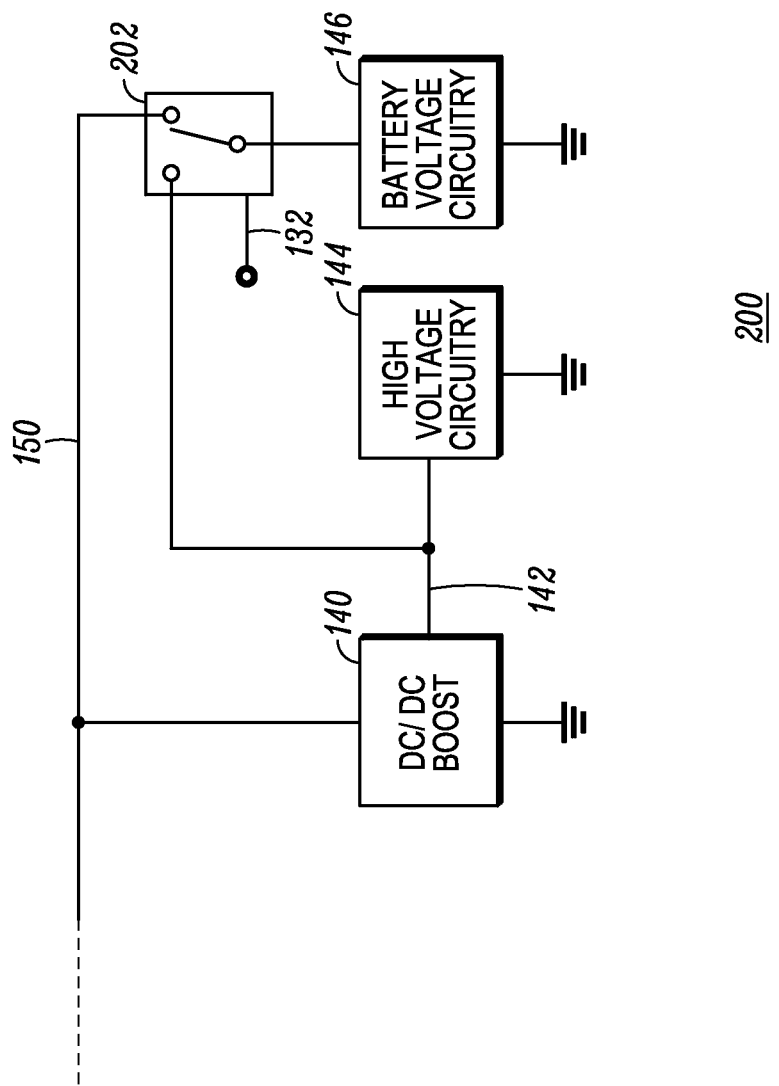
FIG. 2 is a schematic block diagram of a circuit that switches between battery voltage and a boost voltage, in accordance with some embodiments.

FIG. 2 is a schematic block diagram of a circuit 200 that switches between battery voltage and a boost voltage, in accordance with some embodiments. The boost voltage can be generated by a boost converter or another suitable circuit that can use the battery voltage to generate a voltage higher than the battery voltage. The battery voltage circuit 146 can contain circuitry that may not operate properly below a voltage level under the shutdown threshold and is not necessarily meant to include all device circuitry that is powered from the battery voltage line 150. In the event of a high current condition (i.e. current that exceeds the high current threshold), there may be a drop in the voltage on line 150 sufficient to cause issues with circuitry or other loads in the battery voltage circuit 146. Accordingly, to prevent issues from occurring with circuitry in the battery voltage circuit 146 when the battery voltage falls below the shutdown threshold, a boost switch 202 can be used to switch the voltage source supplied to the battery voltage circuit 146 from the battery voltage on line 150 to the boost voltage provided by the boost converter 140. The boost switch 202 can have an input that is connected to the current sense circuit 124 via line 132, and like the voltage monitoring switch 126, when the control signal is asserted by the current sense circuit (or provided by another circuit) the boost switch 202 switches the battery voltage circuit 146 from the battery voltage on line 150 to the boost voltage on line 142 that is provided by the boost converter 140. Thus, during a high current condition, where the battery voltage may drop below a level that is necessary to ensure proper operation circuitry in the battery voltage circuitry 146 (i.e. the shutdown threshold), the boost voltage 142 is supplied to the battery voltage circuit 146 instead of the battery voltage on line 150 via the boost switch 202, ensuring continued proper operation of the battery voltage circuit 146. In some embodiments the control signal that causes the boost switch 202 to switch (or revert) can come from another circuit other than the current sense circuit, such as, for example, the power management controller 138, or some other circuit that is aware of the high current condition.

Figure 3:
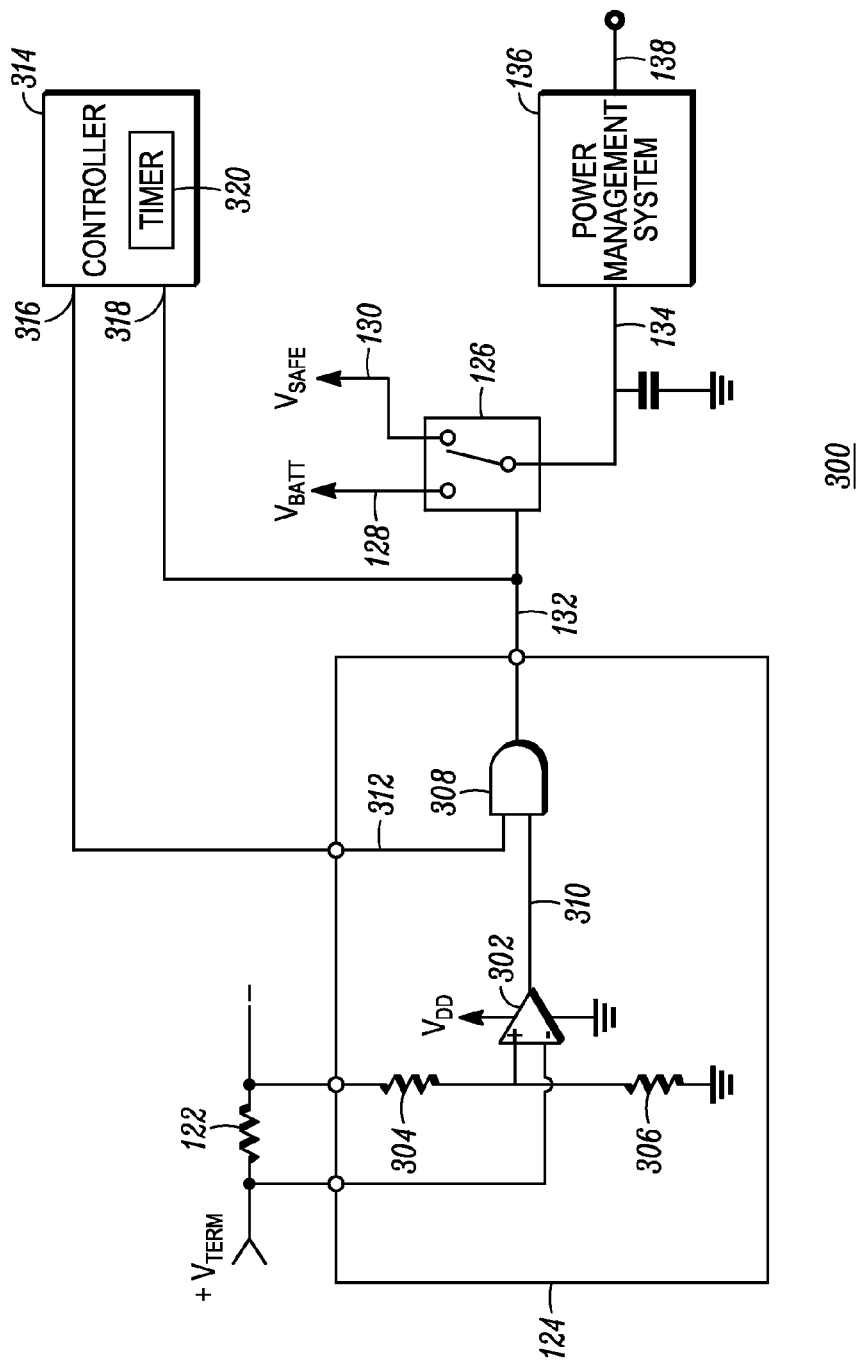
FIG. 3 is a schematic diagram of an implementation of a current sense circuit, in accordance with some embodiments.

FIG. 3 shows a schematic diagram of an implementation 300 of a current sense circuit 124, in accordance with some embodiments. The sense circuit includes a comparator 302 that compares the voltage present at the positive battery terminal (i.e. 118), $V_{term}$ with voltage at the other side of the resistive element 122 used for current sensing. A voltage divider of resistors 304, 306 divide the voltage at the end of the resistive element 122 farther from the positive battery terminal down, and the divided voltage is provided to the non-inverting input of the comparator 302 while $V_{term}$ is provided directly to the inverting input of the comparator 302. Accordingly, when there is very little current through the resistive element 122, the voltage at the inverting input of the comparator will be higher, causing the output 310 of the comparator to be low. When the voltage drop across the resistive element is high enough, as determined by the ratio of the divider resistors 304, 306, the comparator output 310 will be asserted (high). Thus, the high current threshold can be set by selecting the values of the resistive element 122, and the divider resistors 304, 306.

The output 310 of the comparator can be used to directly drive the voltage monitoring switch 126 in some embodiments, and in some embodiments in accordance with implementation 300 the current sensing circuit 124 can be enabled or disabled, such as by line 312. The output 310 of the comparator 302 is coupled to one input of an AND gate 308, and the enable line 312 is connected to another input of the AND gate 308. Accordingly, both the output 310 of the comparator 302 and the enable signal 312 must be high for the AND gate 308 to output a high signal on line 132 as the output of the current sensing circuit 124.

Thus, the output of the current sense circuit 124 can be masked by, for example, a controller 314. The controller 314 can be a general processor of the portable device that controls operation of the portable device. The controller 314 can have an output 316 to provide the enable signal to the AND gate 308 of the current sense circuit 124. Furthermore, the controller 314 can receive the output 132 of the current sense circuit at an input 318 to know when the output 132 is asserted, indicating the existence of a high current condition. In response to the output 132 being asserted, the controller 314 can undertake various operations in response to the high current condition, including, for example, commencing a high current timer 320. Upon the occurrence of a high current event, where the voltage monitoring switch 126 is switched by the output 132 of the current sense circuit 124 to the voltage reference to prevent the power management controller 136 from shutting down the portable device, the timer 320 can be run to prevent a prolonged period of high current from interfering with ordinary shutdown operation. While the timer 320 is pending, the controller 314 can enable the current sense circuit 124 via output 316. Upon expiration of the timer 320, however, the output 316 can be de-asserted, thereby disabling the output 132 by operation of the AND gate 308. When the AND gate 308 is disabled, the output 132 will be de-asserted, causing the voltage monitoring switch 126 to connect the battery voltage (i.e. at the positive battery terminal) to the power management controller 136. If the battery voltage is below the shutdown threshold, then the power management controller 136 will commence the shutdown process to shut down the portable device before the undervoltage switch in the battery is opened.

Figure 4:
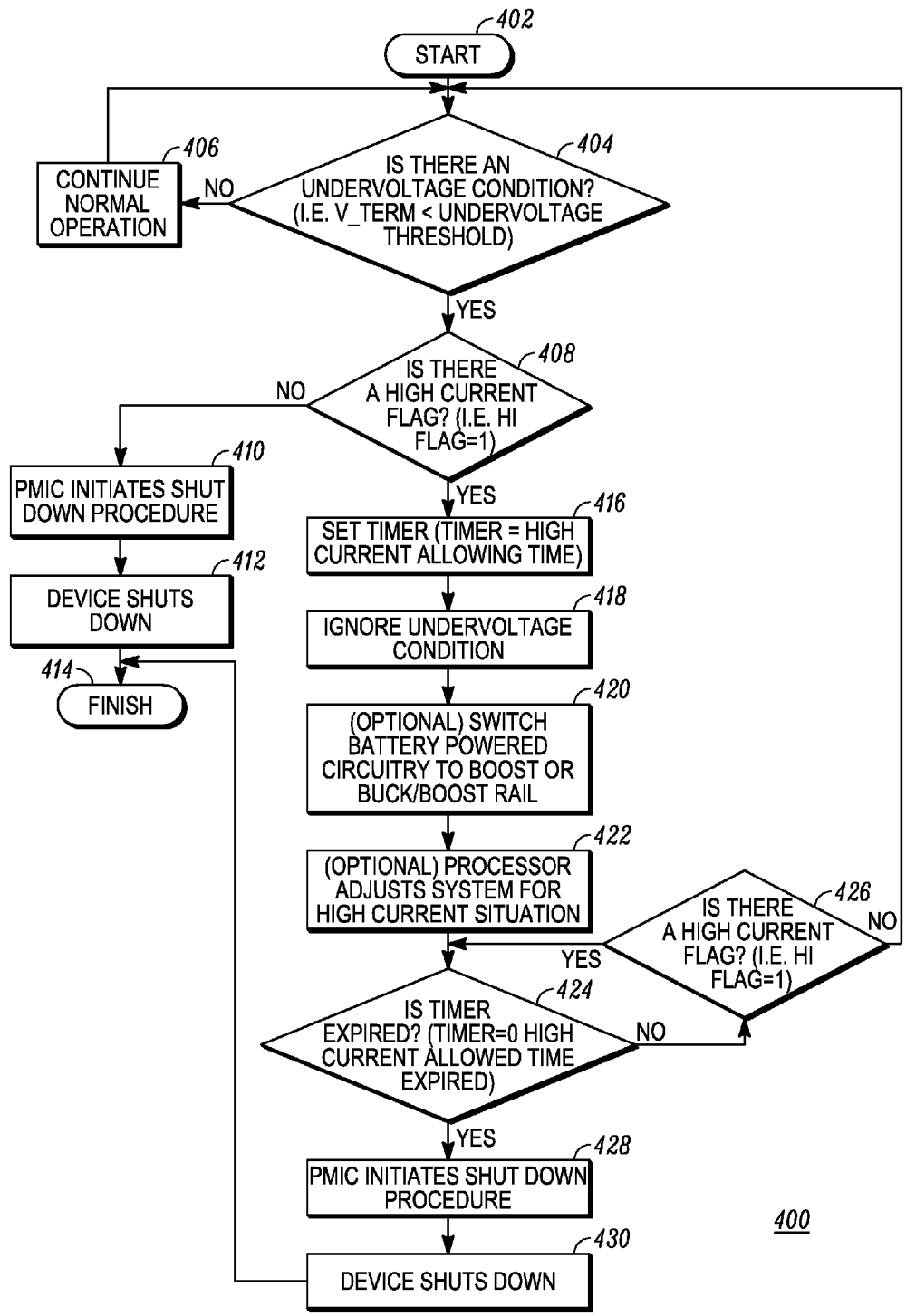
FIG. 4 is a flow chart diagram of a method for avoiding shutdown of a portable device due to a false low voltage condition, in accordance with some embodiments.

FIG. 4 is a flow chart diagram of a method 400 for avoiding shutdown of a portable device due to a false low voltage condition, in accordance with some embodiments. As used here and throughout the Detailed Description, the phrase "false low voltage" refers to an actual voltage that, according to the prior art, would be assumed to indicate a near, or fully discharged batter condition, and does not mean that the voltage is not actually "low" (i.e. below the shutdown threshold). At the start 402 the portable device is powered by the battery and turned on. Step 404 determines whether there is a low voltage condition where the voltage provided by the battery is below a shutdown threshold. In some embodiments it is contemplated that, for example, the current sense circuit 124 can be enabled only when the battery voltage at the positive battery terminal is below the shutdown threshold used by the power management controller 136. This can be accomplished by, for example, a controller (e.g. controller 314) detecting an indication of whether the battery voltage is below the shutdown threshold and enabling the current sense circuit accordingly. In step 404, if there is no indication of a low voltage condition, then in step 406 the method continues ordinary operation. If in step 404 there is a low voltage condition, then in step 408 the method 400 checks to see if there is an indication of a high current condition, such as the assertion of a high current flag, or the output of a current sense circuit being asserted. If there is no high current condition indicated, then in steps 410, 412, and 414 the method 400 initiates a shutdown procedure where the portable device is shut down and the method ends 414. If, in step 408, there is a high current condition indicated, then in step 416 a high current timer can be commenced, and the low voltage condition is momentarily ignored, as indicated by step 418. In some embodiments, as indicated in step 420, one or more battery voltage circuits can be switched to be powered by a boost converter. In some embodiments, as indicated in step 422, a processor of the portable device (e.g. controller 314) can adjust system operation to reduce current demand by the portable device, such as by selectively disabling circuits or sub-systems that are not essential. In step 424 the method 400 determines whether the high current timer commenced in step 416 has expired. If the high current timer is still pending, the method 400 proceeds to step 426 where the method 400 determines whether the high current condition is still occurring, as indicated by the high current flag. If the high current condition is no longer indicated, then the method 400 returns to step 404. If the high current condition is still indicated in step 426 then the method 400 returns to step 424. If, in step 424 the timer is found to have lapsed, then the method 400 proceeds to step 428 where the power management controller is allowed to initiate the shutdown process, and in step 430 the portable device is shut down, and the method 400 is terminated 414. The method 400 can be implemented using various circuit elements, and in some embodiments in conjunction with software executed by a processor, where the software is designed in accordance with some embodiments as described.

Thus, some embodiments include a method for avoiding shutdown of a portable device due to a false low battery voltage condition that includes detecting an input current from a battery into portable device being above a high current threshold, The method can further include modifying, responsive to detecting the input current being above the high current threshold, a voltage sensing input of a power management controller of the portable device from a battery voltage to a voltage source that provides a voltage level above a shutdown threshold level. The power management controller will initiate a shutdown process of the portable device when a voltage at the voltage sensing input is below the shutdown threshold.

Figure 5:
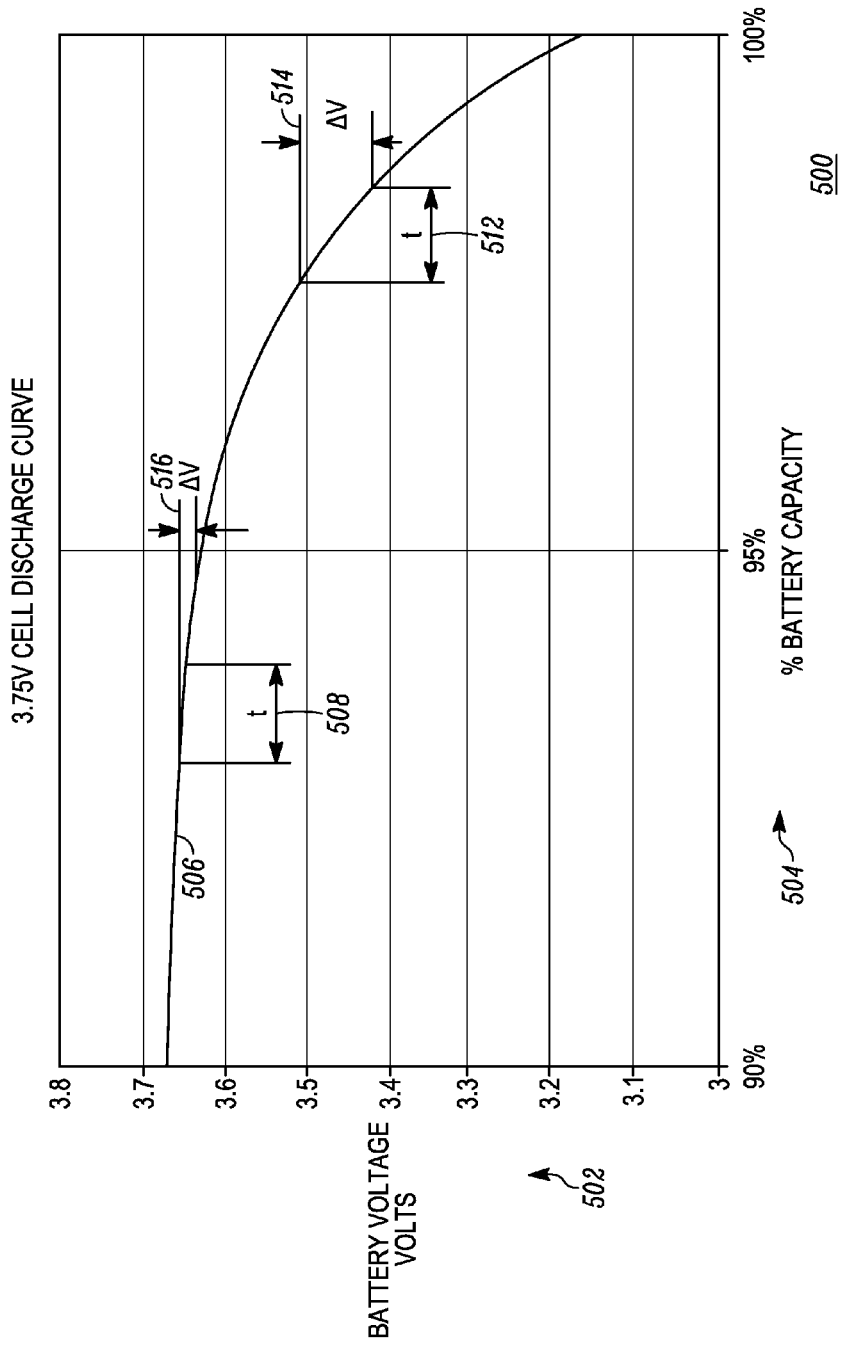
FIG. 5 is a graph chart of battery voltage during discharge indicating differences in voltage drop over time to be used by a portable device to distinguish between false and actual low voltage conditions, in accordance with some embodiments.

FIG. 5 is a graph chart 500 of battery voltage during discharge indicating differences in voltage drop over time to be used by a portable device to distinguish between false and actual low voltage conditions, in accordance with some embodiments. In some embodiments the change in voltage can be used to distinguish actual shut down conditions from merely low voltage conditions resulting from effects other than a low charge state of the battery. The graph chart 500 graphs battery voltage 502 along the vertical axis and battery capacity 504 along the horizontal axis, with each parameter increasing as indicated by their respective arrows. A discharge curve 506 indicates a well-known behavior of battery voltage as the battery is discharged. For most of the discharge time the battery voltage drops gradually, and then as the battery charge approaches a fully discharged state the voltage starts to drop at a higher rate. Thus, during time period 508, for example, when the battery has more than 5% charge remaining, there can be a relatively small change in voltage 510. However, during time period 512, where the battery is closer to being fully discharged, the change in voltage 514 over the same duration of time is much greater than over time period 508. Accordingly, during a high current condition, the battery voltage is dropping at a sufficiently high rate, it can be inferred that the low voltage condition is an actual low voltage condition caused by the battery being nearly discharged. Conversely, if the battery voltage changes only a small amount during the high current period, then it can be inferred that the low voltage condition is a "false" undervoltage condition, and the low voltage is the result of some other parameter (e.g. being unusually cold) and that the battery is not approaching the end of charge condition that requires shutdown of the portable device.

Figure 6:
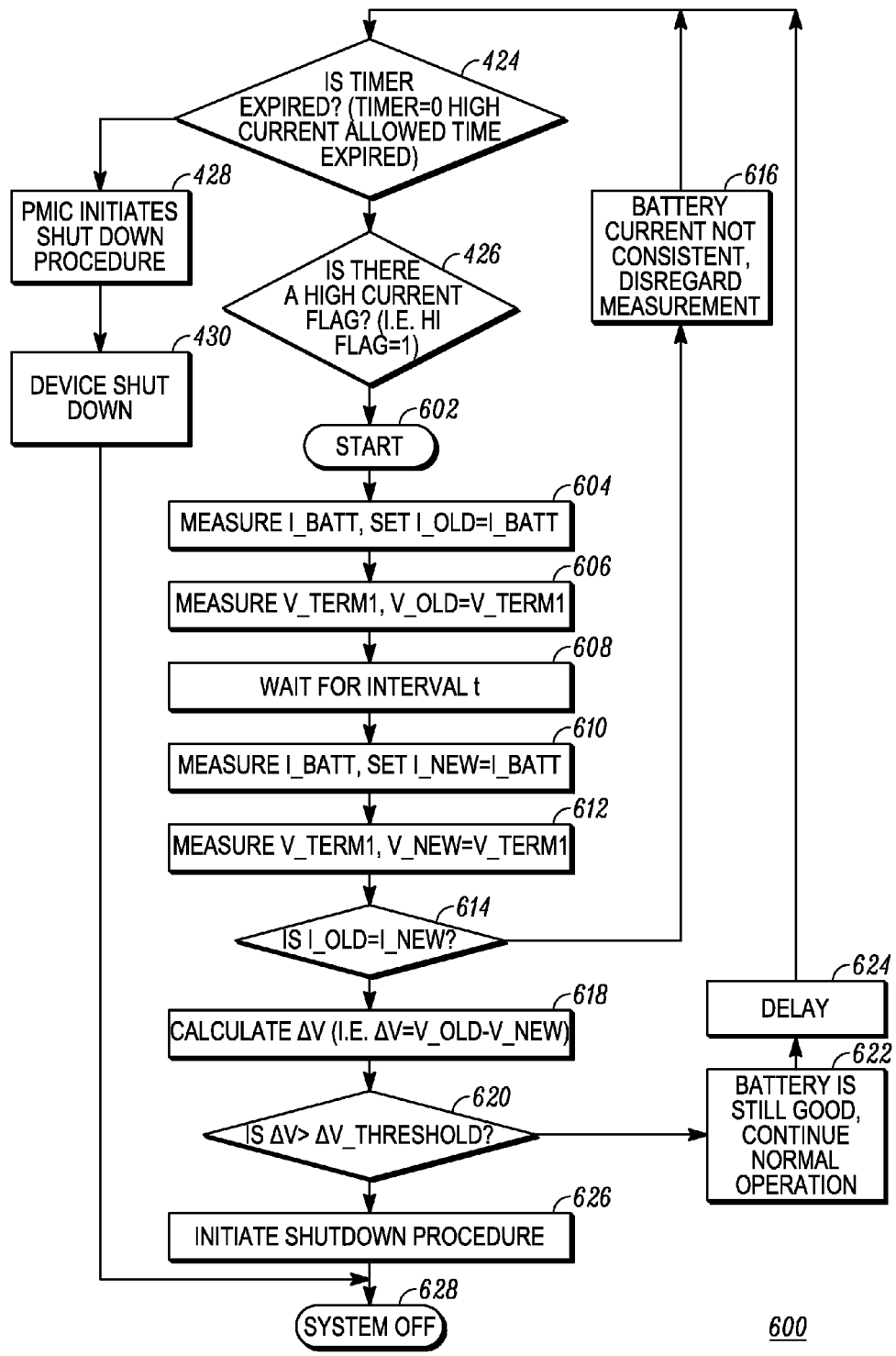
FIG. 6 is a flow chart of a method for monitoring battery voltage during a low voltage condition to distinguish between false and actual low voltage conditions, in accordance with some embodiments.

FIG. 6 is a flow chart of a method 600 for monitoring battery voltage during a low voltage condition to distinguish between false and actual low voltage conditions, in accordance with some embodiments. The method 600 implements the behavior of the battery voltage as indicated by FIG. 5 to augment the method 400 of FIG. 4. Accordingly, steps 424, 426, and 428 of FIG. 4 are shown to indicate where the method 600 can fit into the method 400. In step 426 the method 400 determines whether, after determining in step 424 that the high current timer has not expired, there is still a high current condition present. If no, the method 400 returns to step 404, but if there is still a high current condition indicted, then the method 600 is performed. In step 602, for example, a battery characteristic curve of voltage change for different discharge rates can be read. The curve or curves are prepared beforehand, and provided to the portable device in the form of a table or other suitable data structure. In step 604 the present input current is measured, and in step 606 the present battery voltage is measured. In step 608 a timer occurs to define a time interval during which the method 600 waits. Upon expiration of the time interval of step 608 the current and voltage are again measured in steps 610 and 612, respectively. In step 614 the method 600 evaluates whether there has been a substantial change in the current over the time interval of step 608. If the current has changed substantially, then in step 616 the information is disregarded as the method 600 returns to step 424. If there current has been substantially constant as determined in step 614, then the method 600 proceeds to step 618 where the change in voltage is over the interval of step 608 is determined In step 620 the method 600 determines whether the change in voltage over the time period of step 608 is greater than a voltage change threshold. The voltage change threshold can be based on the magnitude of the current, as determined in step 610, since a higher current will cause voltage to drop at a higher rate. If the voltage change threshold is exceeded in step 620, then the method 600 allows the shutdown procedure to commence in step 626 and the portable device is then shut off in step 628. If, in step 620, the voltage change threshold is not exceeded, the method 600 proceeds to step 622 indicating that the battery is in good condition and not near the end of charge such that shutdown is required. In step 624 a brief time delay can be implemented before the method 600 returns to step 424 of method 400.

Figure 7:
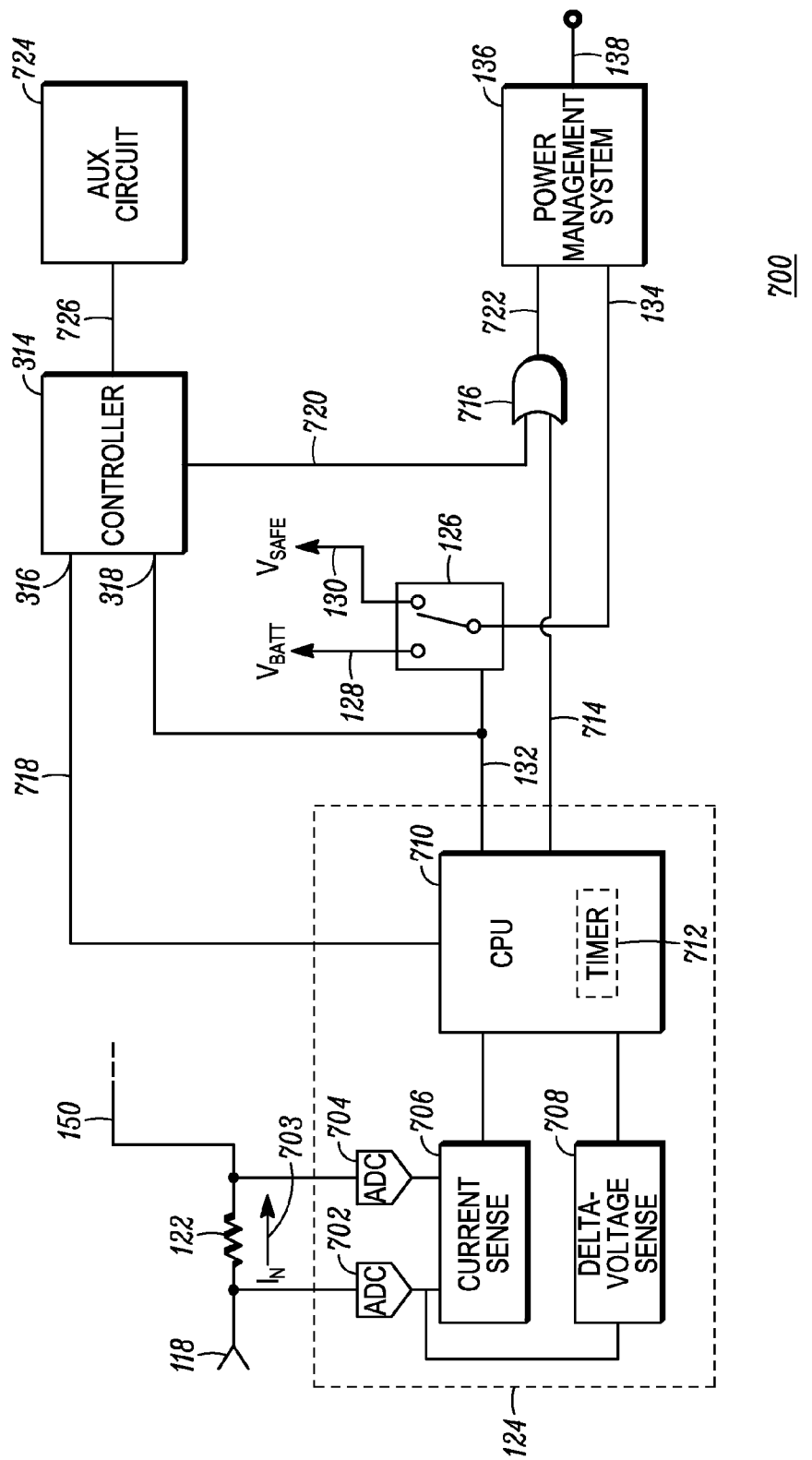
FIG. 7 is a schematic diagram of an implementation of a current sense circuit for a portable device that avoids shutdown due to a false low voltage, in accordance with some embodiments.

FIG. 7 is a schematic diagram of an implementation 700 of a current sense circuit for a portable device that avoids shutdown due to a false low voltage, in accordance with some embodiments. In particular, the implementation allows the method 600 of FIG. 6 to be performed. The current sense circuit 124 is implemented differently than, for example, as shown in FIG. 3. Current 703 through the resistive element 122 is measured by digitizing the voltage at the positive battery terminal, using analog to digital conversion (ADC) process 702, and by digitizing the voltage on the other side of the resistive element 122 using ADC process 704. A current sense block 706 receives the output of ADC processes 702 and 704 and determines a difference, which is proportional to the current through the resistive element 122, and provides the difference to a processor 710 (CPU). A voltage change block 708 also receives the output of the first ADC process 702 which indicates the battery voltage at the positive battery terminal 118. The voltage change block can store voltage values and determine differences in voltage over time intervals, and provide voltage change data to the CPU 710. The CPU 710 can include one or more timers 712 for timing various time periods used in methods 400, 600, for example. The timers can include, for example, a high current time period timer for steps 416, 424, for example; a current and voltage change period timer for step 608; and a delay timer for step 624. Alternatively, as will be appreciated by those skilled in the art, timers can be implemented elsewhere in the portable device with timing indication signals provided to the appropriate circuit(s) for performing operations in accordance with some embodiments.

The CPU 710 provides an output 132 to control the voltage monitoring switch 126 as previously described. The output 132 can also be provided to a controller 314 of the portable device that supervises and controls operation of the portable device to allow the controller to be informed as to when the high current condition is occurring. The controller 314 can provide an enable/disable signal 718 to the CPU 710 of the current sense circuit 124 where the disable signal state causes the CPU 710 to output a signal on 132 that causes the voltage monitoring switch 126 to connect the battery voltage to the power management controller 136 regardless of the current magnitude.

Furthermore, consistent with steps 428 and 626, the CPU 710 can issue a shutdown signal on line 714 that can be evaluated at an OR gate 716 along with a shutdown signal state provided by the controller 314 on line 720. If either the CPU 710 or controller 314 issue a shutdown signal, the OR gate 716 output to the power management controller 136 will be asserted and the power management controller 136 will commence the shutdown procedure. Additionally, as described with regard to step 422, for example, the controller 314 can control one or more auxiliary circuits 724 to reduce current consumption during a high current event, as indicated, for example, by the output 132 of the current sense circuit 124 when the current sense circuit 124 is enabled. The controller 314 can assert a signal on line 726 to auxiliary circuit 724 that disables or otherwise adjust operation of the auxiliary circuit 724 such that it uses less current. For example, a graphical display can reduce a brightness setting to conserve power, or an audio power amplifier can reduce its power level, and so on.

Accordingly, embodiments disclosed herein provide the benefit of avoiding shutdown of a battery-powered portable device due to a low battery voltage that falsely indicates, according to the prior art, a near fully discharged battery, thus allowing continued operation and usage of the remaining charge in a battery having a low terminal voltage. Embodiments disclosed herein determine when the portable device is drawing a high current which, for example, in a cold battery could cause the battery voltage to drop below a conventional prior art shutdown threshold voltage level. In some embodiments the shutdown function can be disabled, at least initially, when a high current event occurs. In some embodiments, the battery characteristics can be observed during the high current event and if they indicate a discharged battery, then the shutdown functionality can be re-enabled to allow shutdown of the portable device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A power management system for a portable device, comprising:
   a power management controller that compares an input voltage provided by a battery of the portable device to a shutdown threshold and initiates a shutdown of the portable device when the input voltage falls below the shutdown threshold;
   a voltage monitoring switch having an output that connects first or second inputs to the power management controller in response to a control input, the first input connected to a positive battery terminal of the battery of the portable device, the second input connected to a voltage source that is higher than the shutdown threshold, wherein the voltage monitoring switch alternately connects either the first input or the second input to the output responsive to a control signal provided to the control input;
   a current sense circuit that provides the control signal to the voltage monitoring switch based on an input current through the positive battery terminal of the portable device, wherein when the input current exceeds a high current threshold, the circuit provides the control signal at a level that causes the voltage monitoring switch to connect the second input to the output, and wherein the control signal is provided to cause the voltage monitoring switch to connect the first input to the output otherwise;
   a boost converter that provides a boost voltage from the battery voltage provided at the positive battery terminal;
   a high voltage circuit powered by the boost converter;
   a battery voltage circuit; and
   a boost switch that is responsive to the control signal provided by the current sense circuit and connects the battery voltage circuit to a battery voltage provided by the positive battery terminal when the input current is below the high current threshold and connects the battery voltage circuit to the boost voltage provided by the boost converter when the input current exceeds the high current threshold.

2. The power management system of claim 1, wherein the current sense circuit comprises:
   a current sensing circuit that produces a current sense voltage that is proportional to current drawn through the positive battery terminal; and
   a comparator that compares the current sense voltage to a current sense threshold that corresponds to the high current threshold.

3. The power management system of claim 1, wherein the current sensing circuit is a portion of a conductor runner on a circuit board of the portable device.

4. The power management system of claim 1, further comprising a timer that times a high current period when current through the positive battery terminal is above the high current threshold, and wherein when the high current period exceeds a maximum high current time period the power management circuit shuts the portable device down.

5. The power management system of claim 1, further comprising a controller that receives the control signal and when the control signal indicates the input current exceeds the high current threshold the controller determines a change in the battery voltage over a period of time and enables the power management circuit to commence shutdown of the portable device when the change in voltage exceeds a voltage drop threshold.

6. The power management system of claim 1, further comprising a controller that receives the control signal and when the control signal indicates the input current exceeds the high current threshold the controller changes operation of at least one auxiliary circuit to reduce the current usage of the auxiliary circuit.

7. A portable device, comprising:
   a positive battery terminal and a negative battery terminal, wherein a battery voltage is present between the positive battery terminal and the negative battery terminal when a battery is connected to the portable device;
   a current sense circuit having an output that asserts a control signal when an input current through the positive battery terminal of the portable device exceeds a high current threshold;

a power management controller that compares an input voltage of the battery to a shutdown threshold and initiates a shutdown of the portable device when the input voltage falls below the shutdown threshold;

a voltage monitoring switch having a first input connected to the positive battery terminal, a second input connected to a voltage source that provides a voltage higher than the shutdown threshold, an output that provides the input voltage to the power management circuit, and a control input that receives the control signal, wherein the voltage monitoring switch normally connects the battery terminal as the input voltage to the power management circuit and switches the input voltage to the voltage source when the control signal is asserted;

a boost converter that provides a boost voltage from a battery voltage provided at the positive battery terminal;

a high voltage circuit powered by the boost converter;

a battery voltage circuit; and a boost switch that is responsive to the control signal provided by the current sense circuit and connect the battery voltage circuit to a battery voltage provided by the positive battery terminal when the input current is below the high current threshold and connects the battery voltage circuit to the boost voltage provided by the boost converter when the input current exceeds the high current threshold.

8. The portable device of claim 7, further comprising a timer that times a high current period when current through the positive battery terminal is above the high current threshold, and wherein when the high current period exceeds a maximum high current time period the power management circuit shuts the portable device down.

9. The portable device of claim 7, further comprising a controller that receives the control signal and when the control signal indicates the input current exceeds the high current threshold the controller determines a change in the battery voltage over a period of time and enables the power management circuit to commence shutdown of the portable device when the change in voltage exceeds a voltage drop threshold.

10. The portable device of claim 7, further comprising a controller that receives the control signal and when the control signal indicates the input current exceeds the high current threshold the controller changes operation of at least one auxiliary circuit to reduce the current usage of the auxiliary circuit.

* * * * *